(12) United States Patent
Chang (10) Patent No.: US 7,367,850 B1
(45) Date of Patent: May 6, 2008

(54) BIDIRECTIONAL COMMUNICATION MODULE JACK ASSEMBLY

(75) Inventor: Ray Chang, Hsichih (TW)

(73) Assignee: Telebox Industries Corp., Taipei Hsien (TW)

( * ) Notice: Subject to any disclaimer, the term of this patent is extended or adjusted under 35 U.S.C. 154(b) by 0 days.

(21) Appl. No.: 11/708,143

(22) Filed: Feb. 20, 2007

(51) Int. Cl.
    H01R 24/00 (2006.01)
(52) U.S. Cl. .................. 439/676; 439/540.1; 439/607
(58) Field of Classification Search ............. 439/676, 439/540.1, 541.5, 79, 607
    See application file for complete search history.

(56) References Cited

U.S. PATENT DOCUMENTS

| | | | |
|---|---|---|---|
| 6,511,348 B1 * | 1/2003 | Wojtacki et al. | 439/620.18 |
| 6,572,411 B1 * | 6/2003 | Aeschbacher et al. | 439/620.21 |
| 6,945,820 B1 * | 9/2005 | Blichasz et al. | 439/620.05 |
| 7,121,898 B2 * | 10/2006 | Murr et al. | 439/676 |
| 7,288,001 B1 * | 10/2007 | Aekins | 439/540.1 |
| 2004/0229501 A1 * | 11/2004 | Caveney et al. | 439/540.1 |

* cited by examiner

*Primary Examiner*—Hien Vu
(74) *Attorney, Agent, or Firm*—Troxell Law Office, PLLC (57) ABSTRACT

A bidirectional communication module jack assembly is disclosed to include a front bracket, a rear bracket fastened to the front bracket, and a plurality of jack modules mounted in between the front bracket and the rear bracket. The front bracket and the rear bracket cause a sense of beauty while giving a maximum protection to the jack modules. Except the use of the front bracket to support the jack modules, the rear bracket enhances the positioning of the jack modules and supports the pressure of module plugs and their electrical wires that are connected to the jack modules from the back side.

3 Claims, 13 Drawing Sheets

BIDIRECTIONAL COMMUNICATION MODULE JACK ASSEMBLY

BACKGROUND AND SUMMARY OF THE INVENTION

The present invention relates to bidirectional communication module jack assembly and more particularly, to an improved structure of bidirectional communication module jack assembly, which causes a sense of beauty while giving a maximum protection to the jack modules against pry attacks. The special structural design of the bidirectional communication module jack assembly requires less installation time and labor, thereby saving much the cost.

Figure 1:
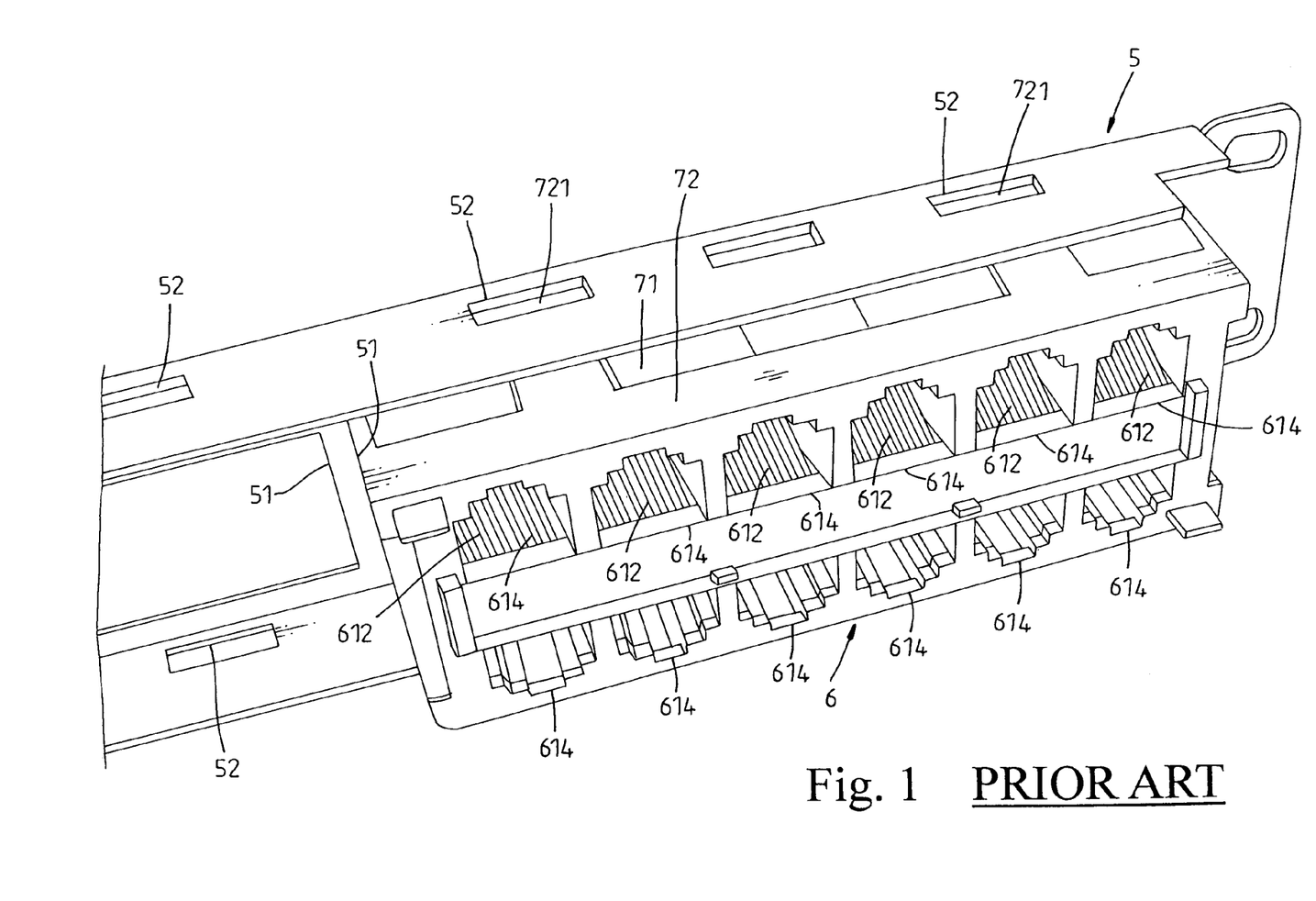
FIG. 1 is a front elevation of a part of a bidirectional communication module jack assembly according to the prior art.
Figure 2:
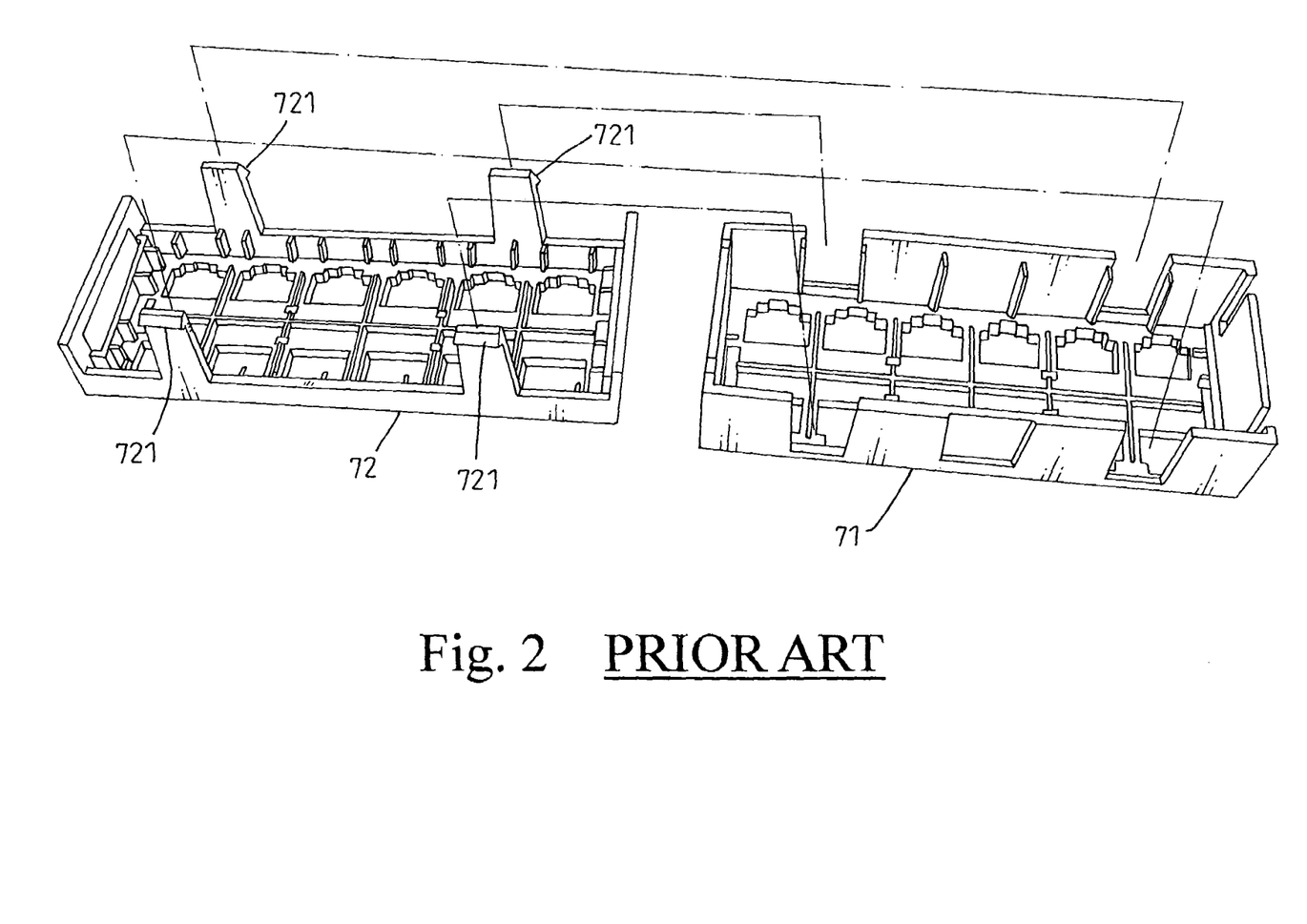
FIG. 2 is an exploded view of a part of one jack module for the bidirectional communication module jack assembly according to the prior art, illustrating the structure of the first and second shielding frames.

FIG. 1 illustrates a bidirectional communication module jack assembly according to the prior art. As illustrated, the bidirectional communication module jack assembly comprises a front base frame 5, which has plurality of chambers 51, and a plurality of jack modules 6 respectively mounted in the chambers 51. Each jack module 6 is comprised of a first shielding frame 71 (see FIG. 2), a second shielding frame 72 (see FIG. 2), and 12 pcs bidirectional module jacks 61 (see FIG. 3). The bidirectional module jacks 61 are inserted into the first shielding frame 71 and abutted against one another, and then the second shielding frame 72 is capped on the first shielding frame 71 to secure the bidirectional module jacks 61 in place. Further, the second shielding frame 72 has a plurality of springy hooks 721 that are fastened to respective hook holes 52 on the front base frame 5 (see FIG. 1).

Figure 3:
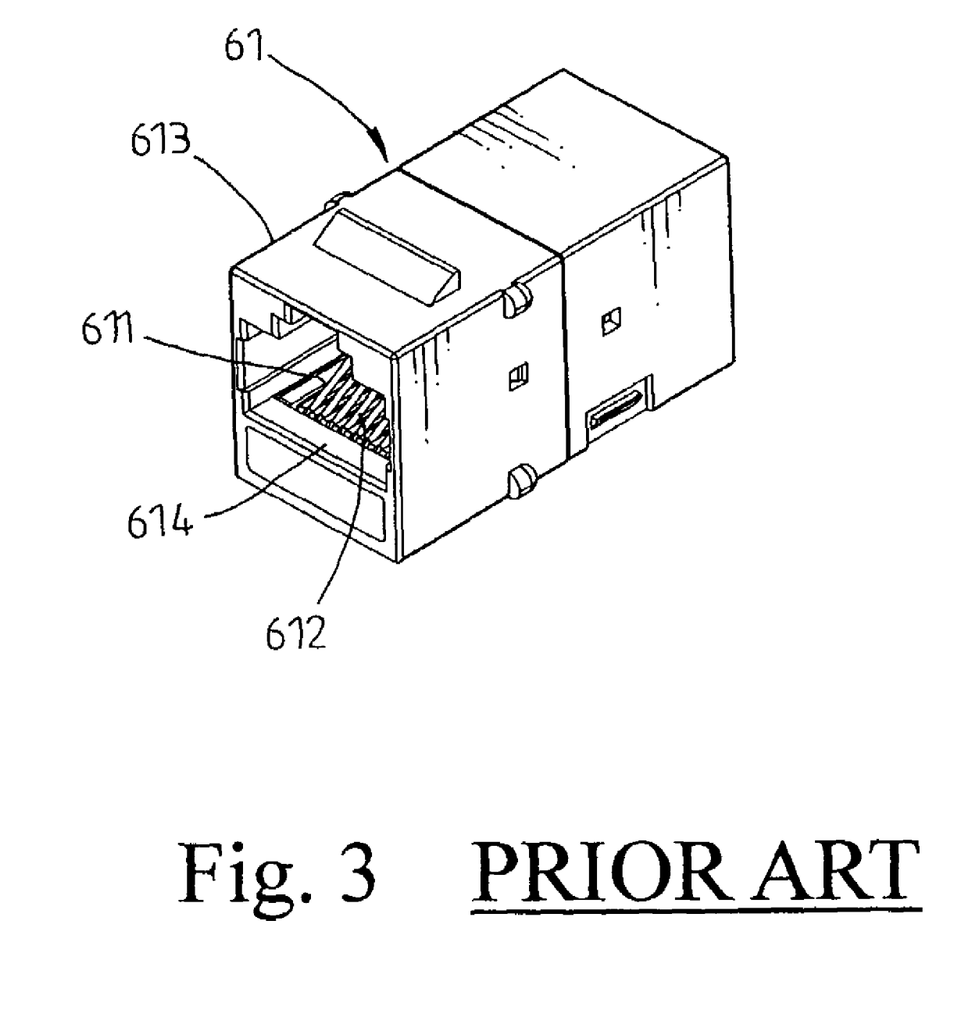
FIG. 3 is an elevational view of one bidirectional module jack for the bidirectional communication module jack assembly according to the prior art.

This design of bidirectional communication socket assembly still has drawbacks as follows:

1. When module plugs (not shown) are inserted into the receiving holes 614 at the front side of the bidirectional module jacks 61 of the jack modules 6, the front base frame 5 bear the gravity weight of the cables of the module plugs. However, when module plugs (not shown) are inserted into the rear receiving holes 614 at the rear side of the bidirectional module jacks 61 of the jack modules 6, bidirectional communication module jack assembly has no means to bear the gravity weight of the cables of the module plugs, and the downward pressure of the gravity weight of the cables of the module plugs may cause disconnection of the junction between the jack modules 6 and the front base frame 5.

2. The bidirectional communication module jack assembly has no means to protect the rear side of the jack modules 6, and the rear side of the jack modules 6 can easily be opened or broken by an evil person.

3. The bidirectional communication module jack assembly has many component parts extended out of the rear side, obstructing the sense of beauty of the assembly.

4. Each bidirectional module jack 61 is comprised of a mini circuit board (not shown), terminal holder 611, conducting terminals 612, and a housing 613. The assembly procedure of each bidirectional module jack 61 is complicated. Further, it requires much time and labor to install total 12 pcs bidirectional module jacks 61 in the first shielding frame 71. After installation of the 12 pcs bidirectional module jacks 61 in the first shielding frame 71, the 2 pcs bidirectional module jacks 61 may be forced out of position accidentally, and the worker must aim the second shielding frame 72 at the 12 pcs bidirectional module jacks 61 and the first shielding frame 71 accurately before capping the second shielding frame 72 onto the first shielding frame 71. If the front base frame 5 has 4 chambers 51, there are total 48 pcs bidirectional module jacks 61 to be installed, requiring much installation time and labor.

The present invention has been accomplished under the circumstances in view. According to one aspect of the present invention, the bidirectional communication module jack assembly comprises a front bracket, a rear bracket fastened to the front bracket, and a plurality of jack modules mounted in between the front bracket and the rear bracket. Except the use of the front bracket to support the jack modules, the invention uses the rear bracket to enhance the positioning of the jack modules and to support the pressure of module plugs and their electrical wires that are connected to the jack modules from the back side. Further, the rear bracket gives a maximum protection to the rear side of each jack module against pry attacks.

According to another aspect of the present invention, the front bracket and the rear bracket cause a sense of beauty while giving a maximum protection to the jack modules.

According to still another aspect of the present invention, the front housing, rear housing and circuit boards for each jack module can easily be assembled with less time and labor, saving much installation cost.

DETAILED DESCRIPTION OF THE INVENTION

Referring to FIGS. 4~13, a bidirectional communication module jack assembly in accordance with the present invention is shown comprised of a front bracket 1, a plurality of jack modules 2, and a rear bracket 3.

Figure 4:
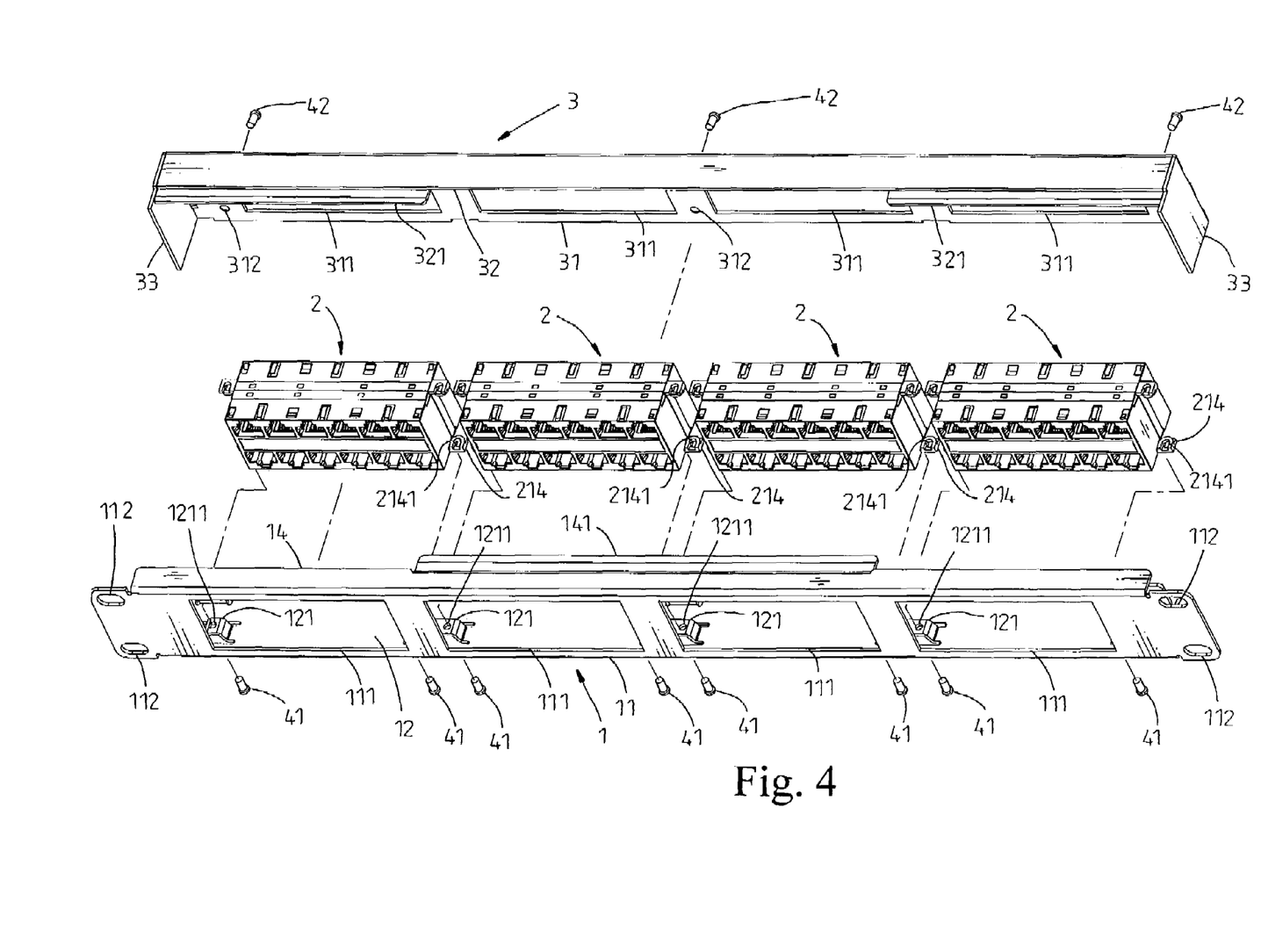
FIG. 4 is an exploded view of a bidirectional communication module jack assembly according to the present invention.
Figure 5:
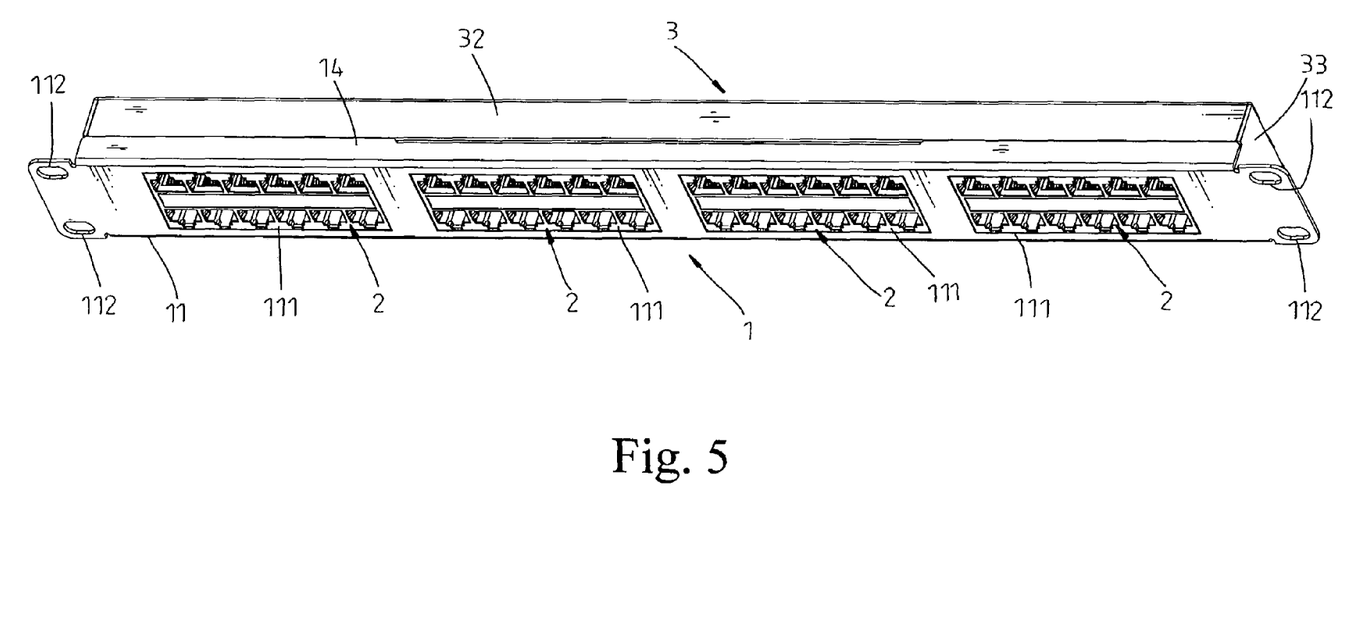
FIG. 5 is an elevational assembly view of the bidirectional communication module jack assembly according to the present invention.
Figure 6:
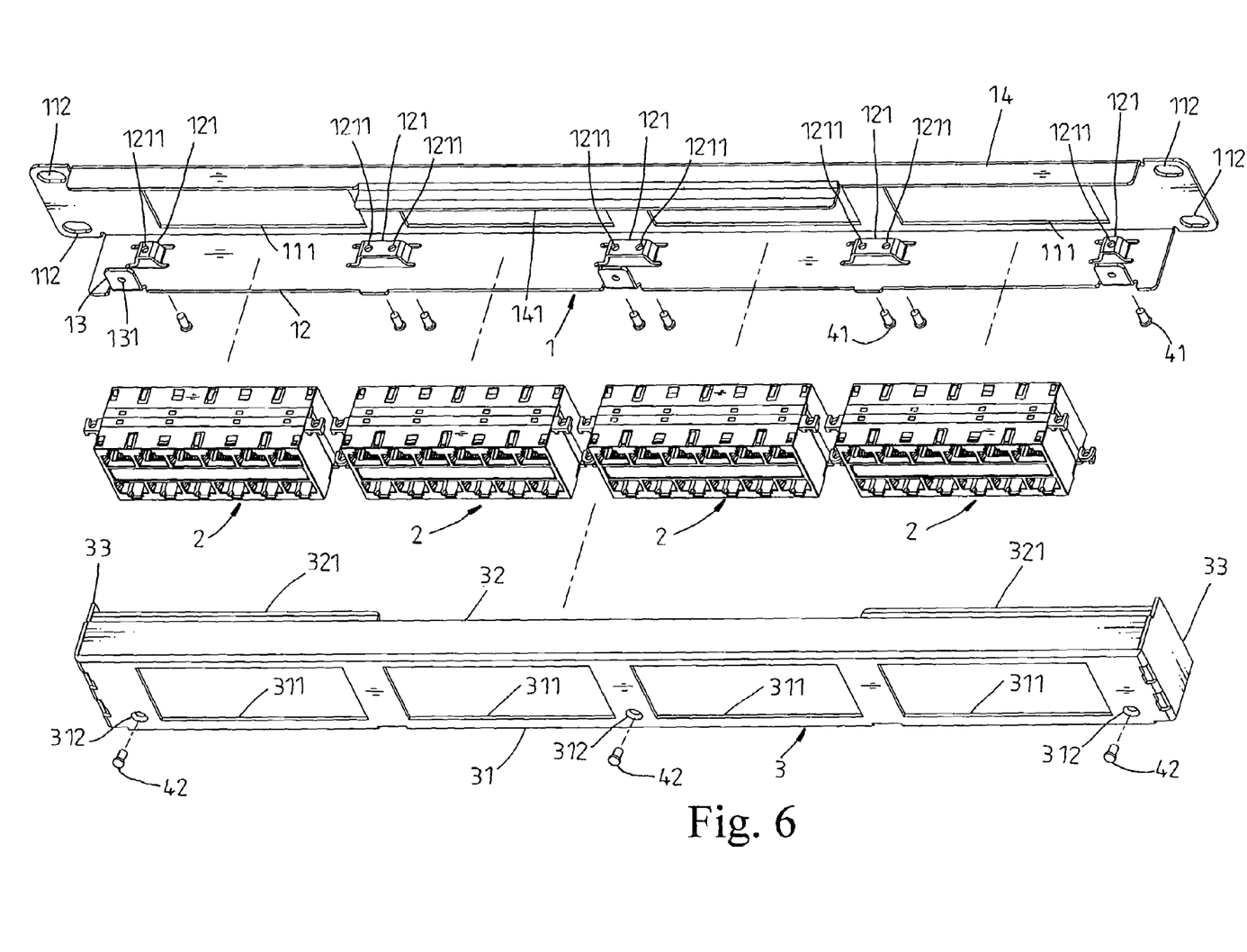
FIG. 6 corresponds to FIG. 4 when viewed from another angle.
Figure 7:
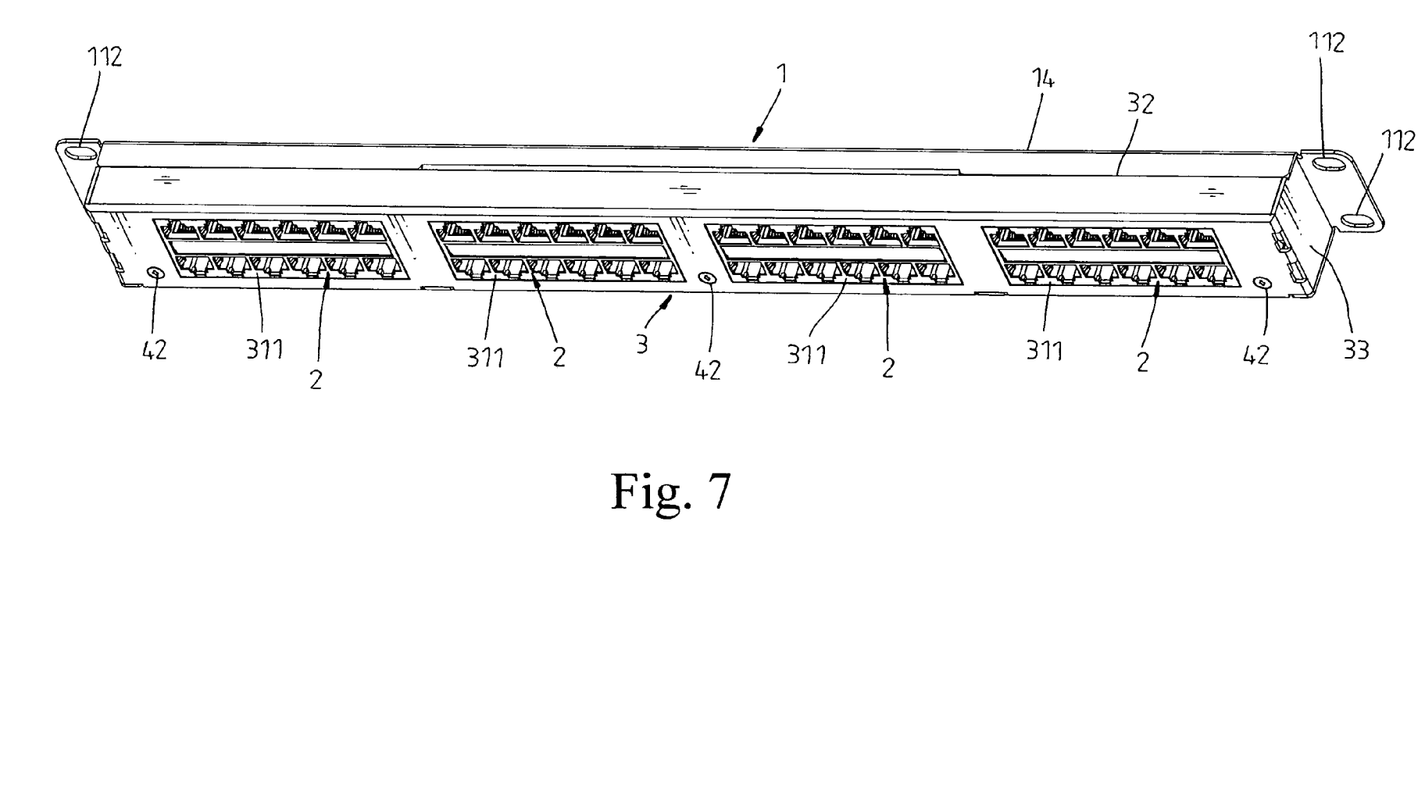
FIG. 7 corresponds to FIG. 5 when viewed from another angle.

The front bracket 1 comprises an elongated face panel 11, a plurality of openings 111 cut through the face panel 11 and arranged in line along the length of the face panel 11, a plurality of mounting through holes 112 symmetrically disposed at the two distal ends of the face panel 11 for the mounting of fastening members (not shown) to affix the front bracket 1 to a predetermined place, a first side panel 12 perpendicularly extended along one long side of the face panel 11, a plurality of bearing blocks 121 protruded from the first side panel 12 for supporting the jack modules 2, the bearing blocks 121 each having a plurality of locating holes 1211 for the mounting of fastening members 41 to affix respective mounting lugs 214 of the jack modules 2 to the bearing blocks 121, a plurality of mounting lugs 13 respectively perpendicularly extended from one side of the first side panel 12 remote from the face panel 11 in a substantially parallel manner relative to the face panel 11, the mounting lugs 13 each having a locating hole 131 respectively fastened to a respective locating hole 312 on the rear bracket 3 by a respective fastening member 42, a second side panel 14 perpendicularly extended along the other long side of the face panel 11 and having a relatively smaller height than the first side panel 12, and a springy flange 141 extended from a middle part of one side of the second side panel 14 remote from the face panel 11.

The rear bracket 3 comprises an elongated face panel 31, a plurality of openings 311 cut through the face panel 31 and arranged in line along the length of the face panel 31, a plurality of locating holes 312 respectively fastened to the locating holes 131 of the mounting lugs 13 of the front bracket 1 by a respective fastening member 42, a side panel 32 perpendicularly extended along one long side of the face panel 31, two springy flanges 321 respectively extended from one side of the side panel 32 remote from the face panel 31, and two end panels 33 respectively perpendicularly extended along the two opposite short sides of the elongated face panel 31.

Referring to FIGS. 8~13, each jack module 2 is comprised of a front housing 21, two circuit boards 22, and a rear housing 23.

The front housing 21 comprises two parallel rows of mounting slots 211, a set of terminal grooves 2111 formed in each of the mounting slots 211 (see FIG. 10), an upper circuit board mounting space 212 and a lower circuit board mounting space 213 defined at the rear side at different elevations in communication with the two parallel rows of mounting slots 211 respectively, two upper insertion holes 2121 disposed in communication with the two distal ends of the upper circuit board mounting space 212, two lower insertion holes 2131 disposed in communication with the two distal ends of the lower circuit board mounting space 213, a plurality of hooks 215 and hook holes 216 symmetrically formed on the top and bottom walls (see FIG. 10) for the mounting of the rear housing 23, a plurality of mounting lugs 214 respectively extended from the two distal ends (see FIGS. 8 and 10), and a plurality of retaining blocks 217 respectively protruded from the top and bottom walls near the front side. The mounting lugs 214 of the front housing 21 each have a locating hole 2141 respectively fastened to the locating holes 1211 of the bearing blocks 121 of the front bracket 1 with a respective fastening member 41.

The rear housing 23 comprises two parallel rows of mounting slots 231, a set of terminal grooves 2311 formed in each of the mounting slots 2311 (see FIG. 11), an upper circuit board mounting space 232 and a lower circuit board mounting space 233 defined at the rear side at different elevations in communication with the two parallel rows of mounting slots 231 respectively, two upper insertion holes 2321 disposed in communication with the two distal ends of the upper circuit board mounting space 232, two lower insertion holes 2331 disposed in communication with the two distal ends of the lower circuit board mounting space 233, a plurality of hooks 235 and hook holes 236 symmetrically formed on the top and bottom walls for fastening to the hook holes 216 and hooks 215 of the front housing 21 respectively, and a plurality of retaining blocks 237 respectively protruded from the top and bottom walls near the front side.

The two circuit boards 22 each comprise two rows of terminal blocks 221 and 222, multiple sets of conducting terminals 5 respectively installed in the terminal blocks 221 and 222 in two reversed directions (the direction of the conducting terminals 5 mounted in one row of terminal blocks 221 is reversed to the direction of the conducting terminals 5 mounted in the other row of terminal blocks 222). The front half of one circuit board 22 is inserted into the upper circuit board mounting space 212 of the front housing 21 (see FIG. 10) to force the terminals 5 of the respective terminal blocks 221 into the respective terminal grooves 2111 of the respective mounting slots 211 (see FIG. 9). The other circuit board 22 is turned upside down and inserted with its front half into the lower circuit board mounting space 213 of the front housing 21 to force the terminals 5 of the respective terminal blocks 222 into the respective terminal grooves 2111 of the respective mounting slots 211. The rear half of one circuit board 22 is inserted into the upper circuit board mounting space 232 of the rear housing 23 to force the terminals 5 of the respective terminal blocks 221 into the respective terminal grooves 2311 of the respective mounting slots 231. The rear half of the other circuit board 22 is inserted into the lower circuit board mounting space 233 of the rear housing 23 to force the terminals 5 of the respective terminal blocks 222 into the respective terminal grooves 2311 of the respective mounting slots 231 (see FIG. 9).

During installation, the locating holes 2141 of the mounting lugs 214 of the front housing 21 of the jack modules 2 are respectively fastened to the locating holes 1211 of the bearing blocks 121 of the front housing 1 with respective fastening members 41 to keep the mounting slots 211 in alignment with the openings 111 respectively and to have the retaining blocks 217 of the front housing 21 be stopped against the top and bottom sides of the inside walls of the openings 111, and then the locating holes 312 of the face panel 31 of the rear bracket 3 are respectively fastened to the locating holes 131 of the mounting lugs 13 of the front bracket 1 by respective fastening members 42 to keep the mounting slots 231 of the rear housing 23 in alignment with the openings 311 of the rear bracket 3 and to have the retaining blocks 237 of the rear housing 23 be stopped against the top and bottom sides of the inside walls of the openings 311 respectively and to have the end panels 33 of the rear bracket 3 block the two distal ends of the row of jack modules 2. Further, before affixing the rear bracket 3 to the front bracket 1, the springy flanges 321 of the rear bracket 3 are respectively inserted into the inside of the front bracket 1 and supported on the inner surface of the second side panel 14 of the front bracket 1, and the springy flange 141 of the second side panel 14 of the front bracket 1 is inserted into the inside of the rear bracket 3 and supported on the inner surface of the side panel 32 of the rear bracket 3. Therefore, fixation of the front bracket 1 and the rear bracket 3 with the fastening members 42, the springy flanges 141 and 321 are pressed on the jack modules 2, enhancing the positioning effect.

Figure 12:
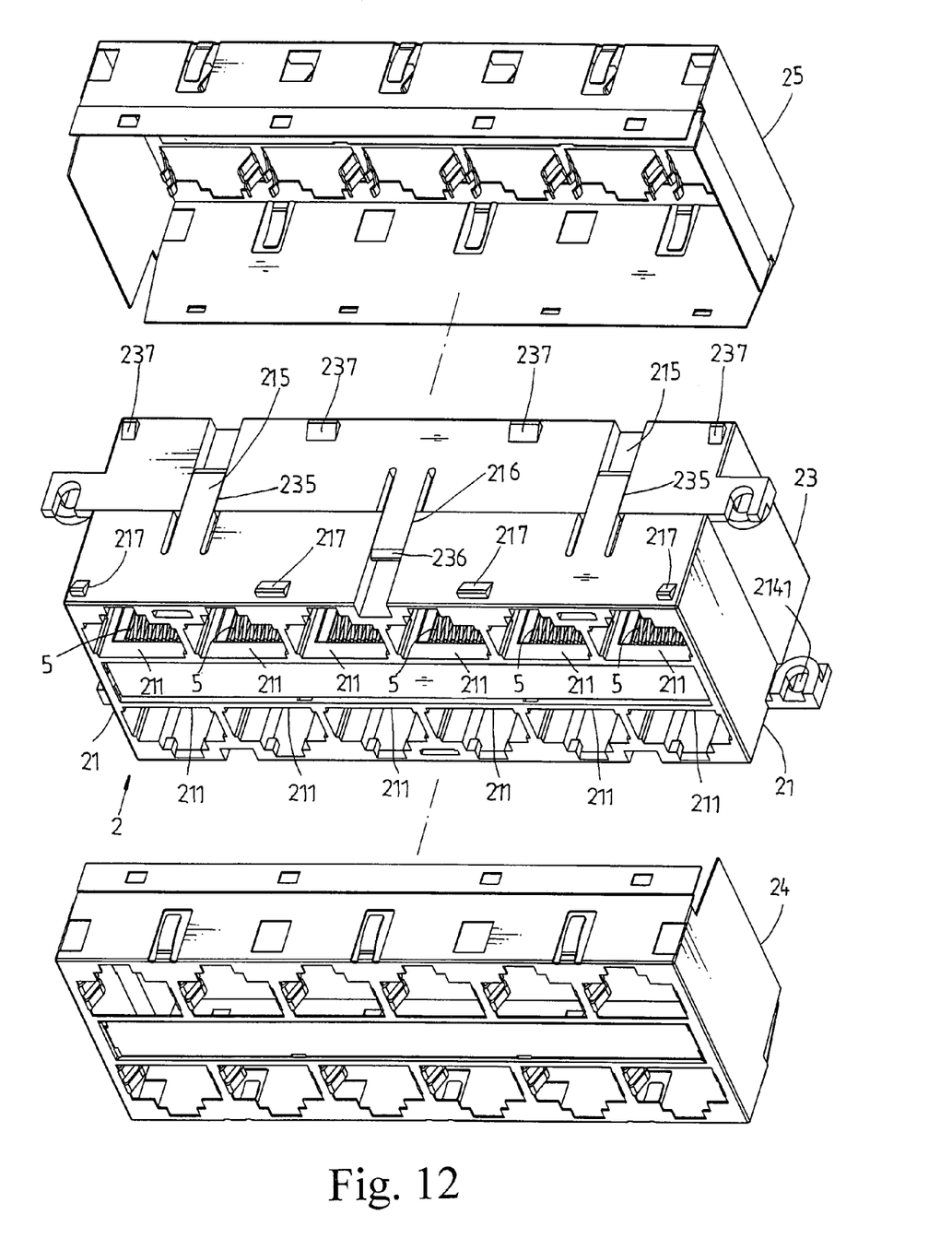
FIG. 12 is an exploded view of a metal front shield, a metal rear shield, and one jack module according to the present invention.
Figure 13:
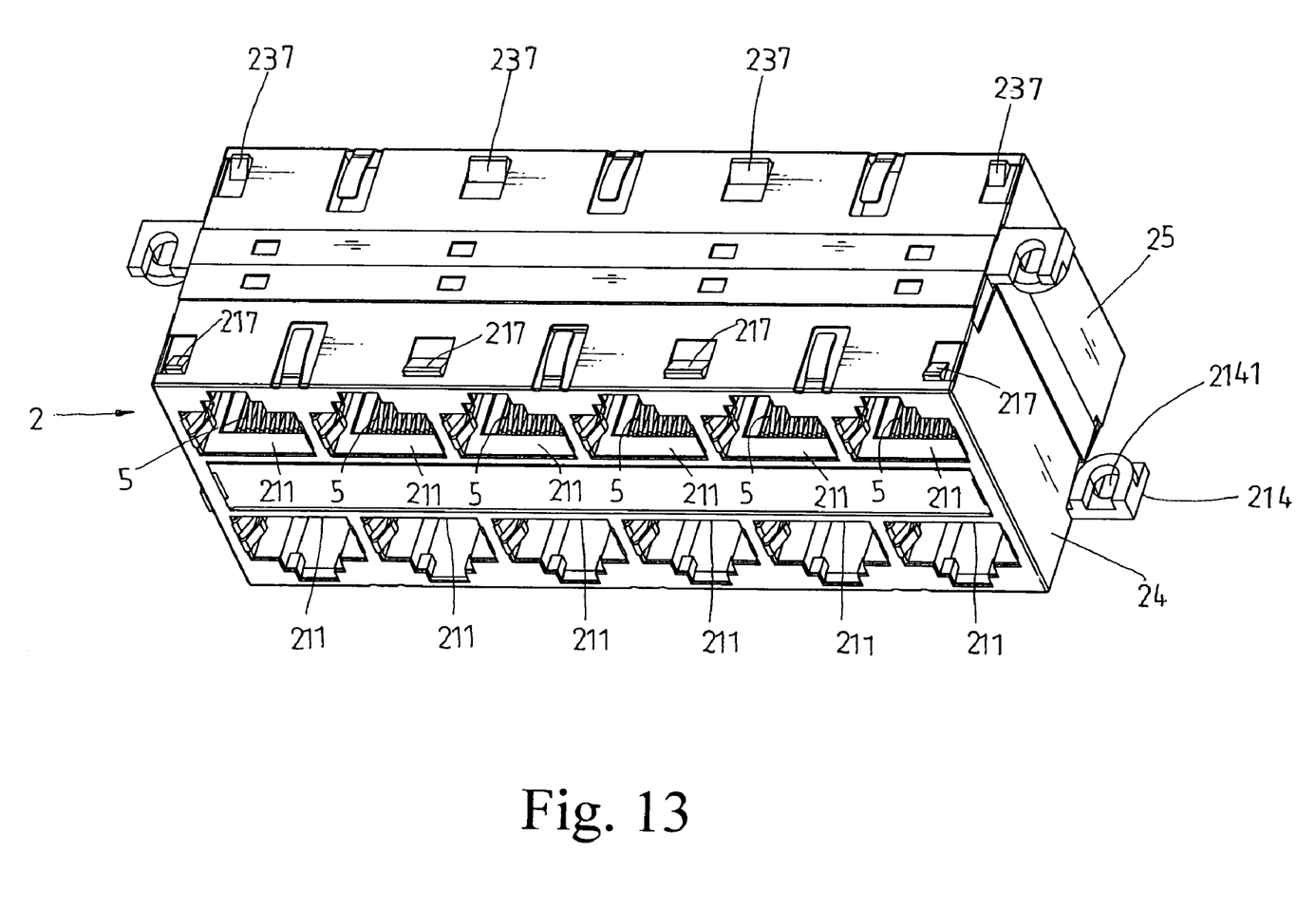
FIG. 13 is an elevational assembly view of FIG. 12.

Referring to FIGS. 12 and 13, a metal front shield 24 and a metal rear shield 25 are respectively covered on the front housing 21 and rear housing 23 of each jack module 2 for EMI (Electromagnetic interference) protection. The metal front shield 24 and the metal rear shield 25 are fastened to the jack module 2 after the front housing 21, the circuit boards 22 and the rear housing 23 have been assembled.

Figure 8:
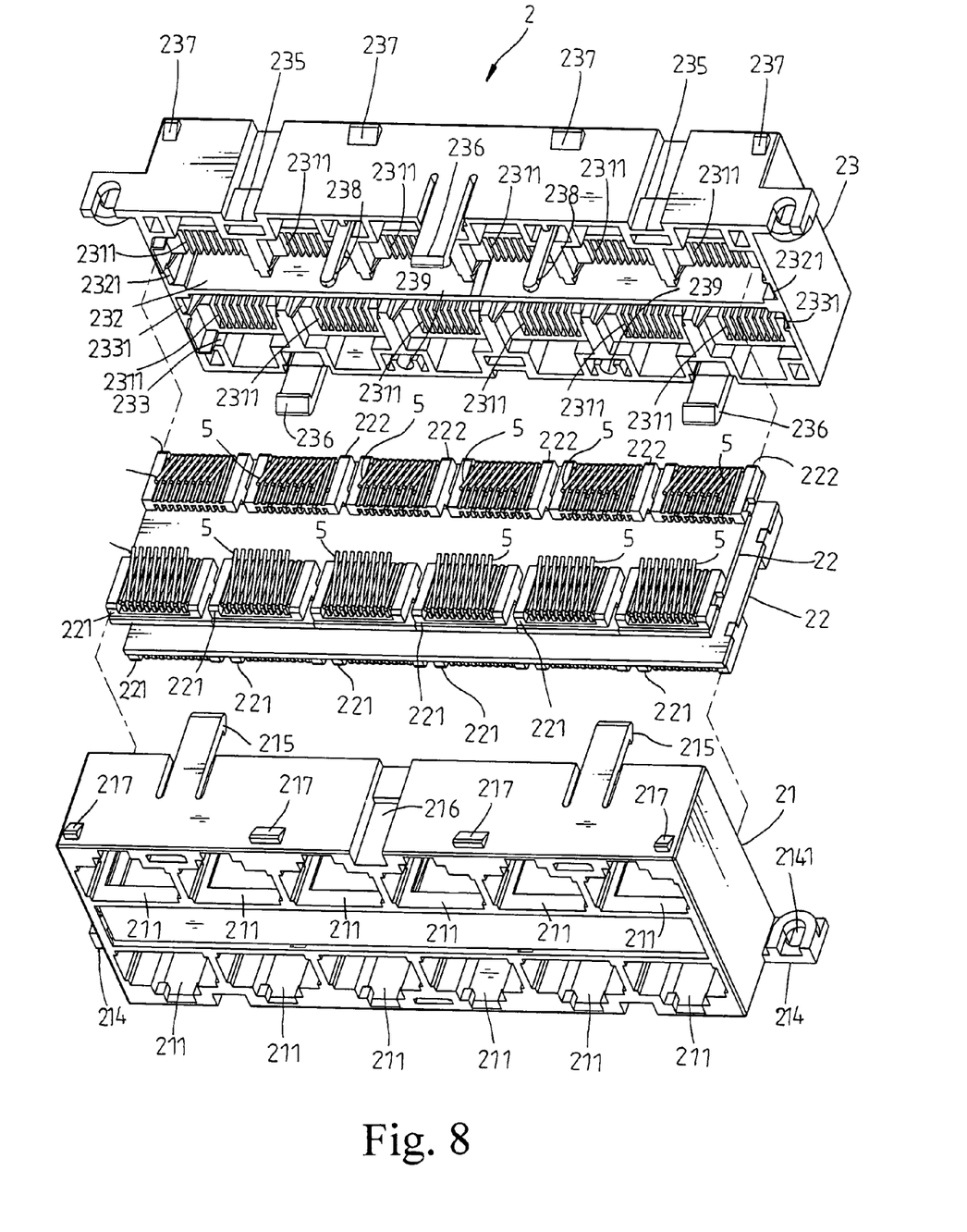
FIG. 8 is an exploded view in an enlarged scale of a part of the present invention, showing the structure of one jack module.
Figure 9:
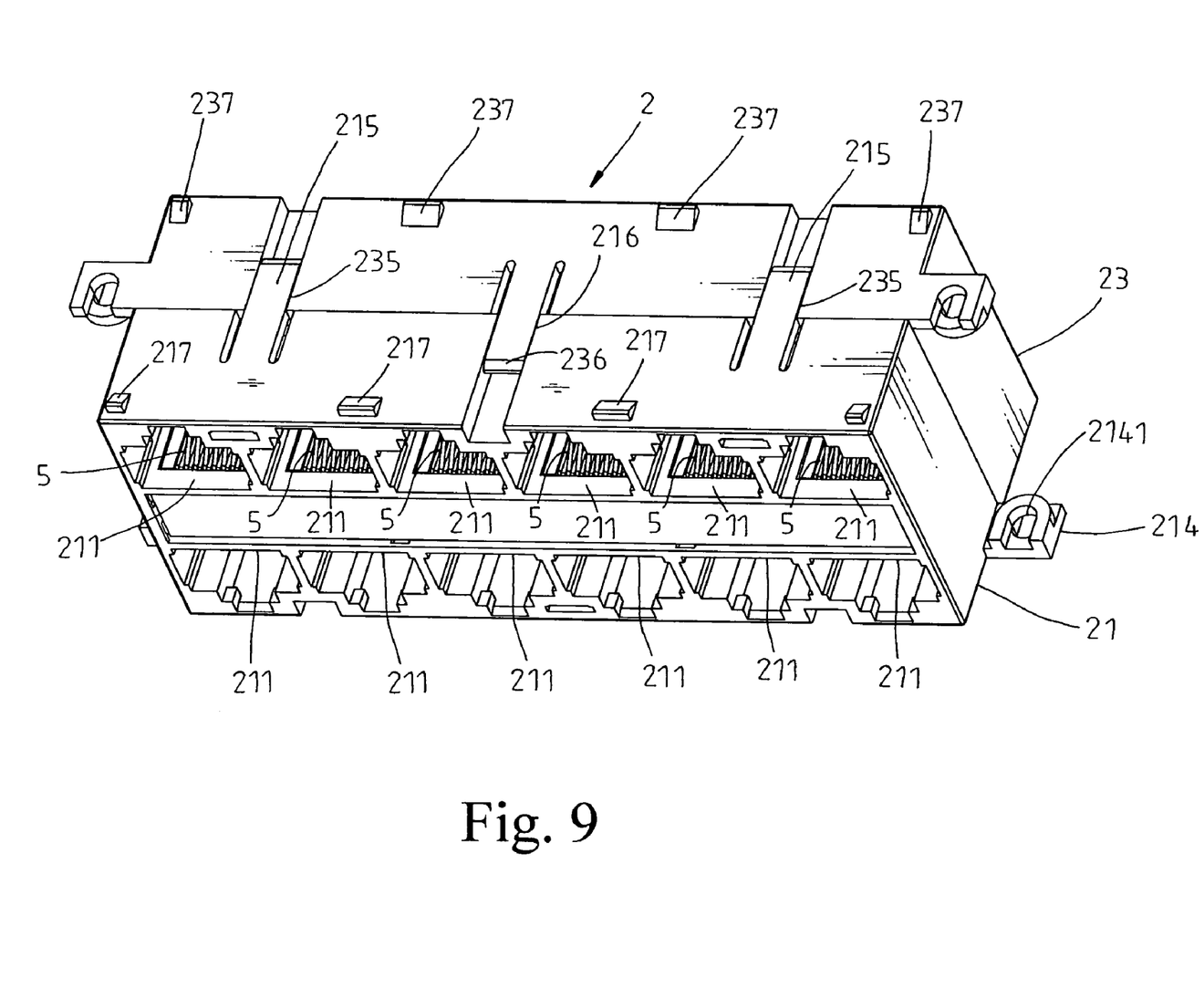
FIG. 9 is an elevational assembly view of FIG. 8.
Figure 10:
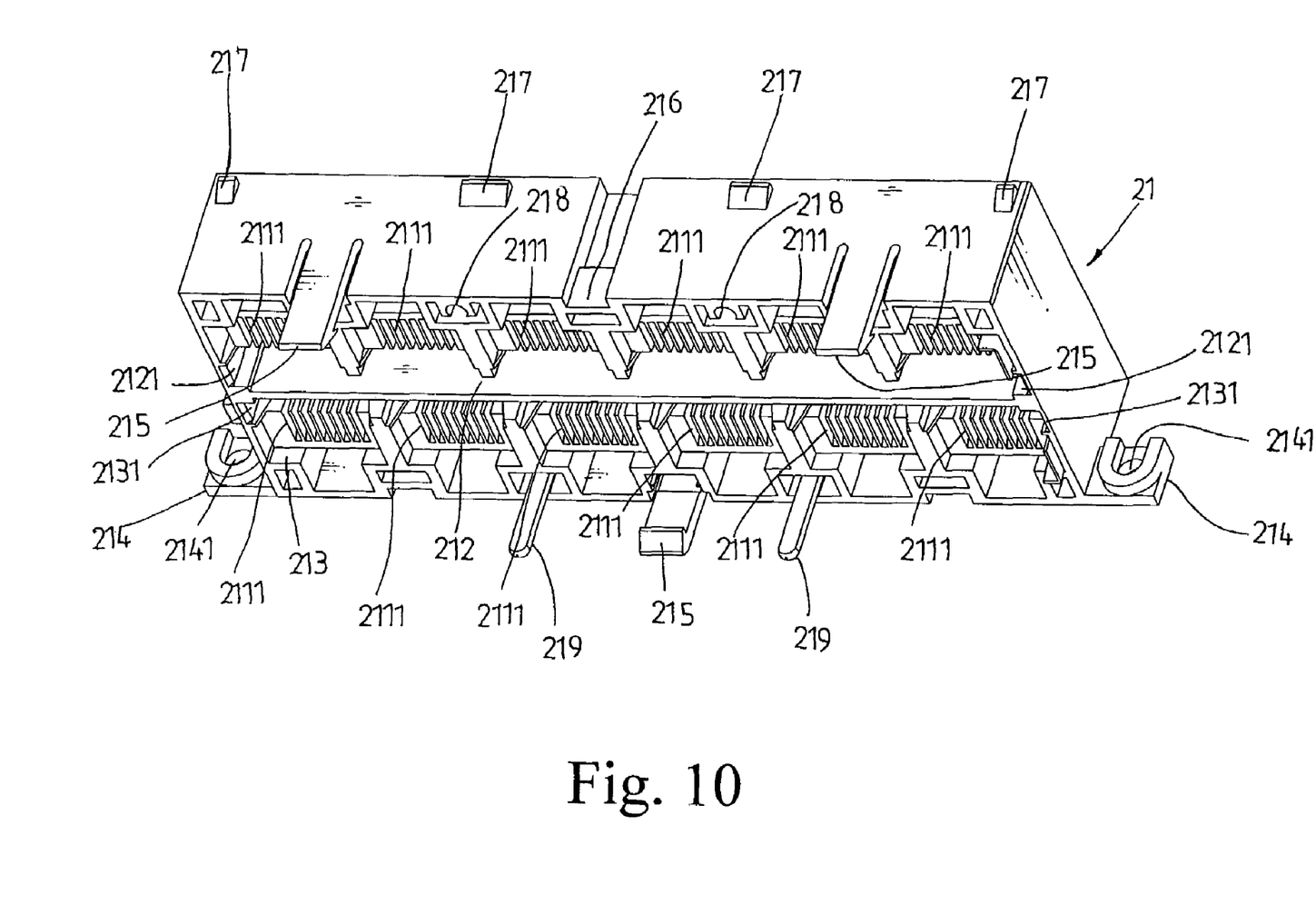
FIG. 10 is an elevational view of a part of FIG. 8, showing the structure of the front housing.
Figure 11:
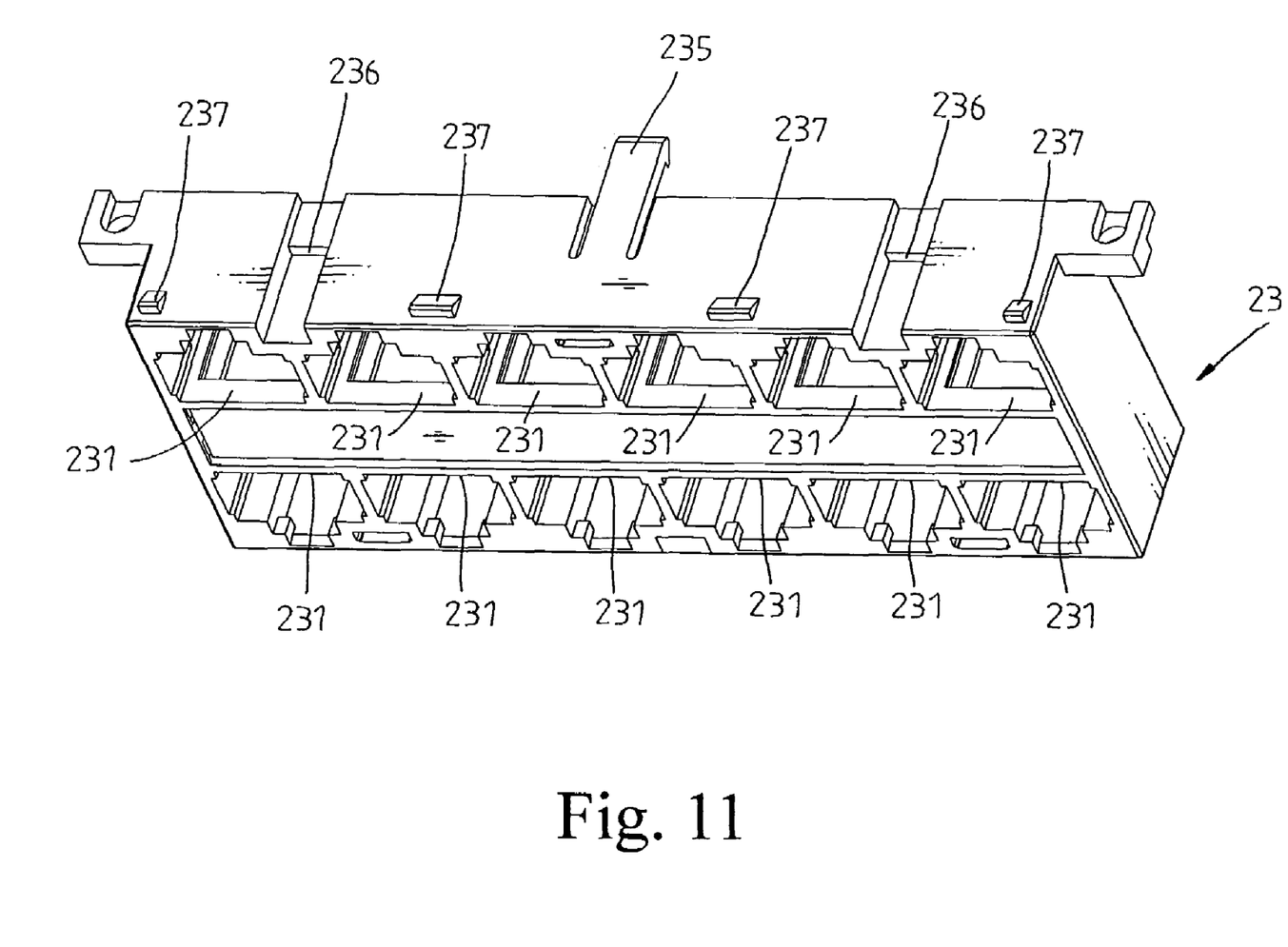
FIG. 11 is an elevational view of a part of FIG. 9, showing the structure of the rear housing.

Referring to FIGS. 8 and 10, the front housing 21 and rear housing 23 of each jack module 2 has a plurality of guide grooves 218 or 238 and guide rods 219 or 239. By means of inserting the respective guide rods 219 and 239 into the respective guide grooves 218 and 238, the front housing 21 and the rear housing 23 are accurately attached secured together.

As stated above, the invention provides a bidirectional communication module jack assembly, which has the following advantages:

1. Except the use of the front bracket 1 to support the jack modules 2, the invention uses the rear bracket 3 to enhance the positioning of the jack modules 2 and to support the pressure of module plugs and their electrical wires that are connected to the jack modules 2 from the back side. Further, the rear bracket 3 gives a maximum protection to the rear side of each jack module 2 against pry attacks.

2. The front bracket 1 and the rear bracket 3 cause a sense of beauty while giving a maximum protection to the jack modules 2.

3. The front housing 21, rear housing 23 and circuit boards 2 for each jack module 2 can easily be assembled with less time and labor, saving much installation cost.

What is claimed is:

1. A bidirectional communication module jack assembly comprising:

a front bracket, said front bracket comprising an elongated face panel, a plurality of openings cut through the face panel of said front bracket and arranged in line along the length of the face panel of said front bracket, a plurality of mounting through holes symmetrically disposed at two distal ends of the face panel of said front bracket for mounting, a first side panel perpendicularly extended along one side of the face panel of said front bracket, a plurality of mounting lugs respectively perpendicularly extended from one side of said first side panel remote from the face panel of said front bracket, said mounting lugs each having a locating hole, a second side panel perpendicularly extended along an opposite side of the face panel of said front bracket, and a springy flange extended from a middle part of one side of said second side panel remote from the face panel of said front bracket;

a rear bracket, said rear bracket comprising an elongated face panel, a plurality of openings cut through the face panel of said rear bracket corresponding to the openings of said front bracket, a plurality of locating holes respectively fastened to the locating holes of the mounting lugs of said front bracket by a respective fastening member, a side panel perpendicularly extended along one long side of the face panel of said rear bracket and attached to an outer side of the springy flange of said front bracket, two springy flanges respectively extended from one side of the side panel of said rear bracket remote from the face panel of said rear bracket and attached to an inner surface of the second side panel of said front bracket, and two end panels respectively perpendicularly extended from two ends of the face panel of said rear bracket; and a plurality of jack modules respectively mounted in the openings of said front bracket and the openings of said rear bracket, said jack modules each comprising:

a front housing, said front housing comprising two parallel rows of mounting slots, a set of terminal grooves formed in each of the mounting slots of said front housing, an upper circuit board mounting space and a lower circuit board mounting space defined at a rear side thereof at different elevations in communication with the two parallel rows of mounting slots of said front housing respectively, two upper insertion holes disposed in communication with two distal ends of the upper circuit board mounting space of said front housing, two lower insertion holes disposed in communication with two distal ends of the lower circuit board mounting space of said front housing, a plurality of hooks and hook holes symmetrically formed on top and bottom walls thereof, a plurality of mounting lug extended from two distal ends thereof for fastening to said front bracket, and a plurality of top and bottom retaining blocks respectively secured to said front bracket;

a rear housing, said rear housing comprising two parallel rows of mounting slots, a set of terminal grooves formed in each of the mounting slots of said rear housing, an upper circuit board mounting space and a lower circuit board mounting space defined at a rear side thereof at different elevations in communication with the two parallel rows of mounting slots of said rear housing respectively, two upper insertion holes disposed in communication with two distal ends of the upper circuit board mounting space of said rear housing, two lower insertion holes disposed in communication with two distal ends of the lower circuit board mounting space of said rear housing, a plurality of hooks and hook holes symmetrically formed on top and bottom walls thereof and respectively fastened to the hook holes and hooks of said front housing, and a plurality of top and bottom retaining blocks respectively secured to said rear bracket; and a first circuit board and a second circuit board, said first circuit board and said second circuit board each comprising two rows of terminal blocks, multiple sets of conducting terminals respectively installed in said terminal blocks in two reversed directions, said first circuit board having a front half inserted into the upper circuit board mounting space of said front housing to force the terminals of the respective terminal blocks into the respective terminal grooves of the respective mounting slots of said front housing and a rear half inserted into the upper circuit board mounting space of said rear housing to force the terminals of the respective terminal blocks into the respective terminal grooves of the respective mounting slots of said rear housing, said second circuit board having a front half inserted into the lower circuit board mounting space of said front housing to force the terminals of the respective terminal blocks into the respective terminal grooves of the respective mounting slots of said front housing and a rear half inserted into the lower circuit board mounting space of said rear housing to force the terminals of the respective terminal blocks into the respective terminal grooves of the respective mounting slots of said rear housing.

2. The bidirectional communication module jack assembly as claimed in claim 1, wherein said front bracket comprises a plurality of bearing blocks protruded from the first side panel thereof for supporting said jack modules, said bearing blocks each having a plurality of locating holes respectively fastened to the mounting lugs of said jack modules with a respective fastening member.

3. The bidirectional communication module jack assembly as claimed in claim 1, wherein the front housing of each of said jack modules comprises a plurality of guide grooves and a plurality of guide rods; the rear housing of each of said jack modules comprises a plurality of guide rods for insertion into the guide grooves of the associating front housing respectively, and a plurality of guide grooves for receiving the guide rods of the associating front housing respectively.

* * * * *